UNITED STATES PATENT OFFICE.

JOSEPH D. BRYANT, OF COLUMBUS, OHIO.

LIQUID WAX FINISH.

975,394.  Specification of Letters Patent.  Patented Nov. 15, 1910.

No Drawing.  Application filed May 10, 1909.  Serial No. 495,015.

*To all whom it may concern:*

Be it known that I, JOSEPH D. BRYANT, a citizen of the United States, residing at Columbus, in the county of Franklin and State of Ohio, have invented a certain new and useful Improvement in Liquid Wax Finish, of which the following is a specification.

The object of this invention is to provide an improved compound in liquid form for imparting a wax finish to floors and articles of wood.

The invention is embodied in the compound and method of preparing the same as hereinafter particularly set forth and claimed.

The compound as I now manufacture it, comprises the following ingredients mixed in the manner and quantities by weight, as stated in the following example, towit: Thirty-two ounces of kauri gum; fifty ounces of carnauba wax; thirty ounces of beeswax; fifty ounces of stearic acid; eleven hundred and twenty ounces turpentine. Or to express the matter in a more general way I take by weight approximately twenty parts of kauri gum, thirty one parts of carnauba wax, eighteen parts of bees wax, and thirty one parts of stearic acid and reduce them to liquid form in approximately seven times their combined weight of turpentine.

The above named ingredients are mixed as follows: The kauri gum is first reduced to a liquid state by heat in a kettle and then the waxes and stearic acid added. The heat of the gum dissolves the waxes. After this the turpentine is added while the mixture is at a temperature of about one hundred and fifty degrees Fahrenheit. The materials may be stirred, if desired, to effect the more rapid solution and mixing. The proportions of the ingredients and the manner of compounding them can be varied, but I have found that those indicated produce the most satisfactory results. The turpentine serves to keep the ingredients in liquid form in ordinary temperatures. The gum imparts hardness and durability to the compound and aids in overcoming the tacky property imparted by a preponderance of wax; and the stearic acid, according to my observation experience and understanding, assists in preventing the wax from granulating or crystallizing and settling in the container. Stearic acid also as I believe promotes quick, hard drying.

The compound is quite thin and fluent and can be applied with ordinary cotton waste or a soft cloth; and because the compound dries in a few minutes, it can be promptly rubbed down to obtain the polish. Several coats can be applied, but it is the better practice to allow an interval of at least four or five hours for thorough hardening between the application of coats.

Other varieties of waxes, or one variety of wax can be used. The kauri gum can be omitted and its place supplied with an equal weight of carnauba wax but the inclusion of the gum yields the practical advantage hereinbefore pointed out.

The application for this patent was divided and the separated matters claimed in two applications for patents of the United States, filed August 1, 1910, Serial Numbers 574,852 and 574,853.

What I claim is:

1. A liquid wax finish compound consisting of the following ingredients in approximately the following proportions by weight, towit: twenty parts of kauri gum, thirty one parts of carnauba wax, eighteen parts of bees wax, thirty one parts of stearic acid and seven times their combined weight of turpentine, substantially as described.

2. A liquid wax finish compound consisting of the following ingredients in approximately the following proportions by weight, towit: twenty parts of kauri gum, forty nine parts of wax, thirty one parts of stearic acid and seven times their combined weight of turpentine, substantially as described.

JOSEPH D. BRYANT.

Witnesses:
A. L. RALSTON,
M. A. SECHLER.